(12) United States Patent
Zhang et al.

(10) Patent No.: US 10,000,134 B2
(45) Date of Patent: Jun. 19, 2018

(54) WIRELESS CHARGING SYSTEM FOR CHARGING VEHICULAR BATTERY

(71) Applicants: DENSO International America, Inc., Southfield, MI (US); THE REGENTS OF THE UNIVERSITY OF MICHIGAN, Ann Arbor, MI (US)

(72) Inventors: Wei Zhang, Westland, MI (US); Jeff C. White, Lasalle (CA); Chris Mi, Canton, MI (US)

(73) Assignees: DENSO International America, Inc., Southfield, MI (US); The Regents of The University of Michigan, Ann Arbor, MI (US)

( * ) Notice: Subject to any disclaimer, the term of this patent is extended or adjusted under 35 U.S.C. 154(b) by 127 days.

(21) Appl. No.: 15/082,475

(22) Filed: Mar. 28, 2016

(65) Prior Publication Data

US 2017/0274788 A1    Sep. 28, 2017

(51) Int. Cl.
*H02J 7/00*    (2006.01)
*B60L 11/18*    (2006.01)
*H02J 7/02*    (2016.01)
*H02J 50/90*    (2016.01)
*H02J 50/80*    (2016.01)
*H02J 50/10*    (2016.01)

(52) U.S. Cl.
CPC ......... *B60L 11/1829* (2013.01); *B60L 11/182* (2013.01); *B60L 11/1838* (2013.01); *H02J 7/025* (2013.01); *H02J 50/10* (2016.02); *H02J 50/80* (2016.02); *H02J 50/90* (2016.02); *B60L 11/1831* (2013.01); *B60L 11/1833* (2013.01); *B60L 2230/10* (2013.01)

(58) Field of Classification Search
CPC .. H02J 7/025; H02J 5/005; H02J 17/00; H02J 50/80; H02J 50/90; H02J 7/0027; H02J 7/0004; H02J 50/10; H02J 50/40; B60L 11/182; B60L 2230/16; B60L 2230/10; B60L 11/1829; B60L 11/1833; B60L 11/1838; B60L 11/1831
See application file for complete search history.

(56) References Cited

U.S. PATENT DOCUMENTS 5,821,731 A * 10/1998 Kuki .................. B60L 11/1805
                                                320/108
6,941,197 B1 * 9/2005 Murakami .......... B60L 11/1816
                                                320/109

(Continued)

FOREIGN PATENT DOCUMENTS

JP        2013123319 A  *  6/2013  .............. B60L 5/005

*Primary Examiner* — Helen Rossoshek
(74) *Attorney, Agent, or Firm* — Harness, Dickey & Pierce, P.L.C.

(57) ABSTRACT

A wireless charging system may be used to charge a battery in a vehicle via a receiving coil. The wireless charging system may include a coil charge device, a linear track, a linear motor, and a charge control module. The coil charge device includes a carriage and a transmitting coil positioned on the carriage. The linear track extends across a designated path. The coil charge device is positioned on and moveable along the linear track. The linear motor is operable to move the coil charge device along the linear track. The charge control module controls a position of the coil charge device along the designated path via the linear motor.

16 Claims, 2 Drawing Sheets

(56) References Cited

U.S. PATENT DOCUMENTS

| | | | |
|---|---|---|---|
| 8,456,038 B2 | 6/2013 | Azancot et al. | |
| 8,947,047 B2* | 2/2015 | Partovi | H01F 5/003 |
| | | | 320/108 |
| 9,287,720 B2* | 3/2016 | Kawamura | B60L 11/182 |
| 9,649,948 B2* | 5/2017 | Bell | B60L 11/1831 |
| 2008/0210762 A1* | 9/2008 | Osada | G06K 19/0701 |
| | | | 235/492 |
| 2009/0045773 A1* | 2/2009 | Pandya | B60L 5/005 |
| | | | 320/108 |
| 2009/0258604 A1* | 10/2009 | Andronic | H02J 17/00 |
| | | | 455/73 |
| 2010/0031856 A1* | 2/2010 | Shoda | B60L 5/005 |
| | | | 108/21 |
| 2011/0254503 A1 | 10/2011 | Widmer et al. | |
| 2012/0206098 A1* | 8/2012 | Kim | B60L 11/182 |
| | | | 320/108 |
| 2012/0326523 A1* | 12/2012 | Fukushima | H02J 5/005 |
| | | | 307/104 |
| 2013/0076296 A1* | 3/2013 | Ushiroda | B60L 3/12 |
| | | | 320/101 |
| 2013/0082652 A1* | 4/2013 | Jung | H02J 7/0013 |
| | | | 320/108 |
| 2013/0119927 A1* | 5/2013 | Partovi | H02J 7/025 |
| | | | 320/108 |
| 2013/0154554 A1* | 6/2013 | Sakai | H02J 7/025 |
| | | | 320/108 |
| 2013/0249479 A1* | 9/2013 | Partovi | H02J 7/025 |
| | | | 320/108 |
| 2014/0002015 A1* | 1/2014 | Tripathi | B60L 11/182 |
| | | | 320/108 |
| 2014/0132210 A1* | 5/2014 | Partovi | H02J 7/025 |
| | | | 320/108 |
| 2014/0292270 A1* | 10/2014 | Ichikawa | B60L 7/14 |
| | | | 320/108 |
| 2014/0333256 A1* | 11/2014 | Widmer | B60L 11/182 |
| | | | 320/108 |
| 2015/0091503 A1* | 4/2015 | Hyde | B60L 11/1803 |
| | | | 320/108 |
| 2015/0288216 A1* | 10/2015 | Wu | H02J 7/025 |
| | | | 320/101 |
| 2015/0352963 A1* | 12/2015 | Grabar | H02J 50/90 |
| | | | 320/108 |
| 2016/0052414 A1* | 2/2016 | Bell | G01M 17/007 |
| | | | 320/108 |
| 2016/0052415 A1* | 2/2016 | Bell | B60L 11/1833 |
| | | | 320/108 |
| 2016/0059723 A1* | 3/2016 | Kim | B60L 11/1831 |
| | | | 320/108 |
| 2016/0072334 A1* | 3/2016 | Wu | H02J 50/90 |
| | | | 320/108 |
| 2016/0075245 A1* | 3/2016 | Logvinov | B60L 11/1829 |
| | | | 320/108 |
| 2016/0129793 A1* | 5/2016 | Cronie | B60L 11/182 |
| | | | 320/109 |
| 2016/0254677 A1* | 9/2016 | McKernan | B60L 11/182 |
| | | | 307/9.1 |
| 2016/0332572 A1* | 11/2016 | Gibeau | B60R 1/00 |
| 2017/0001527 A1* | 1/2017 | Prokhorov | B60L 11/1831 |
| 2017/0001531 A1* | 1/2017 | Takatsu | B60L 11/182 |
| 2017/0008409 A1* | 1/2017 | Roberts | B60L 11/1829 |

\* cited by examiner

WIRELESS CHARGING SYSTEM FOR CHARGING VEHICULAR BATTERY

FIELD

The present disclosure relates to a wireless charging system for charging a battery of a vehicle, such as an electric and/or hybrid vehicle.

BACKGROUND

This section provides background information related to the present disclosure which is not necessarily prior art.

In an effort to reduce fossil fuel emissions and other pollutants emitted from automobiles that use internal combustion engines, hybrid electric automobiles (HEV) and electric automobiles (EV) have been designed and implemented to mitigate the environmental effects of the internal combustion engine. HEVs and EVs may include a battery system that powers a motor utilized for driving the vehicle. The battery system may be charged by connecting the battery system to an electrical grid by way of a cable.

The battery system may also connect to the electrical grid by implementing a wireless or contactless charging system (i.e., wireless power transfer system). A wireless charging system may utilize the mutual inductance between two inductive coils to provide power to the battery system of the HEV or EV. The electrical grid may induce a voltage at a first coil and, as a result of the inductive coupling between the first coil and a second coil connected to the battery system of the HEV or EV, the second coil will induce a voltage and subsequently charge the battery system of the HEV or EV.

The wireless charging system can require one transmitting coil for each receiving coil. The number of transmitting and receiving coils is equal to the number of vehicles to be charged by the wireless charging system. For example, a charging station that charges a battery in a vehicle via wireless charging may be capable of charging up to four vehicles and, therefore, may require one transmitting coil for each of the vehicles. The costs associated with the transmitting coil, the power electronics circuits used for supplying electric voltage to the transmitting coil, and the overall infrastructure of the charge station can be expensive and complex. Thus, a more cost effective wireless charging system may be needed for charging multiple vehicles.

SUMMARY

This section provides a general summary of the disclosure, and is not a comprehensive disclosure of its full scope or all of its features.

The present disclosure is generally directed toward a wireless charging system that charges a battery in vehicle by way of wireless power transfer between a receiving coil and a transmitting coil. In an aspect of the present disclosure, the wireless charging system includes a coil charge device, a linear track, a linear motor, and a charge control module. The coil charge device may include a transmitting coil and a carriage, where the transmitting coil is positioned on the carriage. The linear track extends across a designated path, and the coil charge device is positioned on and moveable along the linear track. The linear motor is operable to move the coil charge device along the linear track. The charge control module is configured to control a position of the coil charge device along the designated path via the linear motor and operate the transmitting coil during a charge operation to charge the battery of the vehicle.

The wireless charging system of the present disclosure may be used to charge the battery of multiple batteries located at different parking spaces without requiring a separate transmitting coil for each parking space. For example, in an aspect of the present disclosure, the linear track extends across two or more parking spaces, and the coil charge device is moveable to any one of the two or more parking spaces. Thus, the wireless charging system is capable of charging vehicles located at different parking spaces by moving the transmitting coil to the vehicle to be charged.

Further areas of applicability will become apparent from the description provided herein. The description and specific examples in this summary are intended for purposes of illustration only, and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Electric or hybrid vehicles may include a coil (i.e., a receiving coil) mounted along a chassis of the vehicle. A transmitting coil installed in a floor of a parking space for a vehicle may induce a current in the receiving coil in order to charge a battery positioned in the vehicle. The wireless transfer of power for charging a vehicle battery typically requires one pair of transmitting coil and receiving coil. The number of transmitting coils and receiving coils is equal to the number of vehicles ready for charging. Accordingly, the cost of the infrastructure needed to support the charging of each vehicle increases.

The present disclosure presents a wireless charging system that includes a transmitting coil that is movable across multiple parking spaces to charge multiple vehicles. The wireless charging system of the present disclosure reduces the number of transmitting coils needed for charging multiple vehicles, as described herein.

Figure 1:
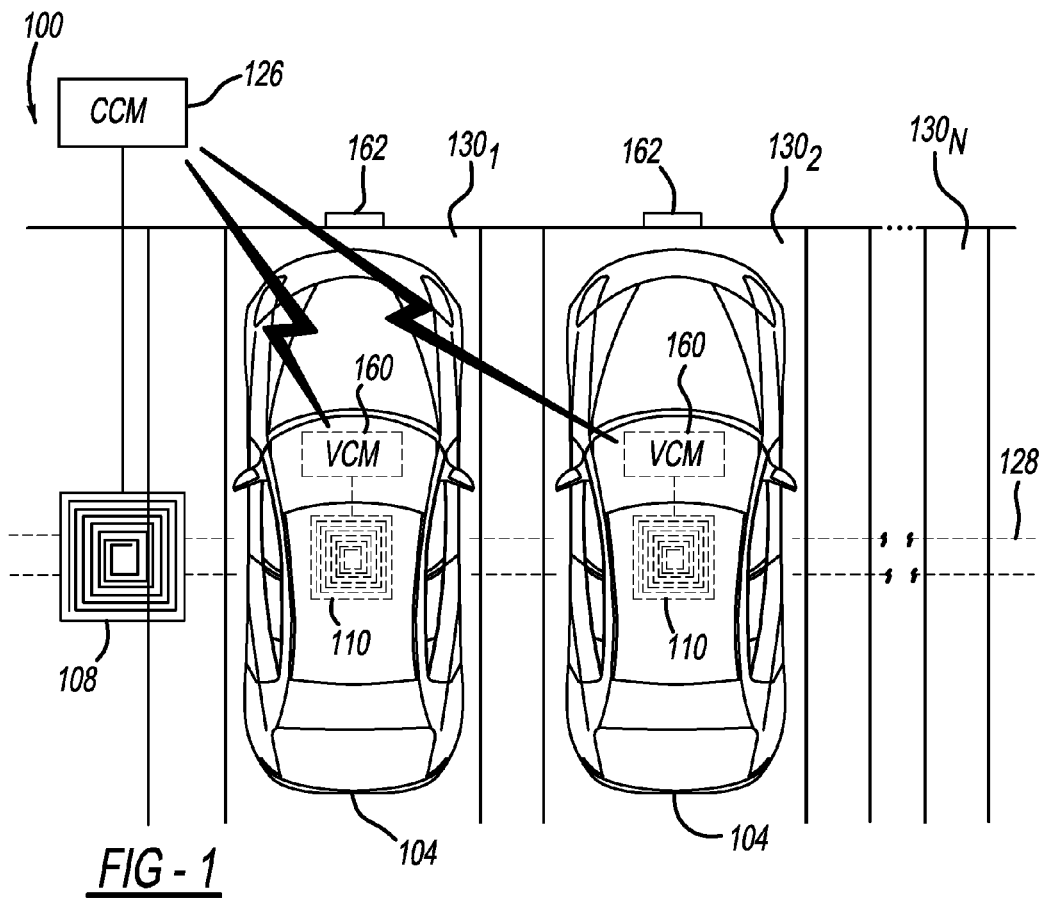
FIG. 1 illustrates a wireless charging system of the present disclosure.
Figure 2:
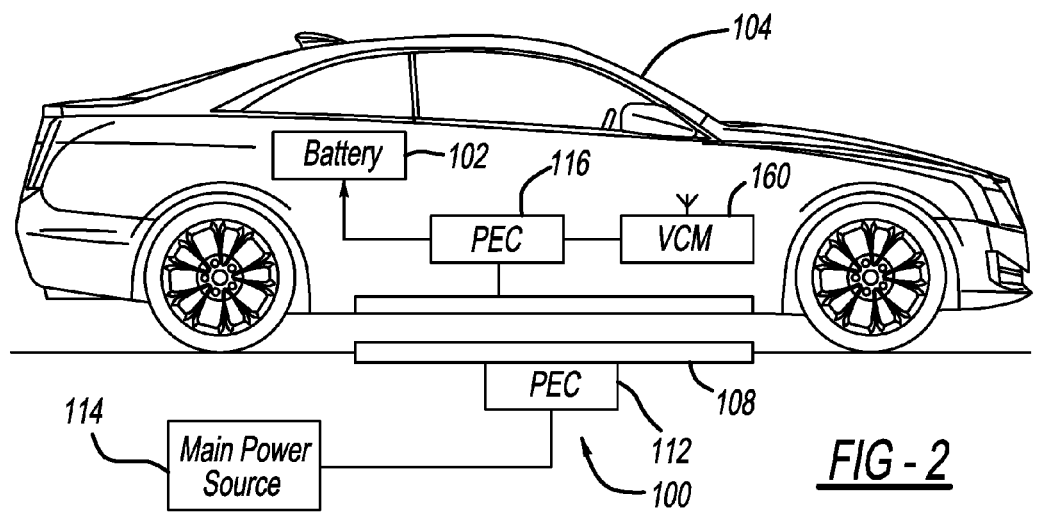
FIG. 2 illustrates a transmitting coil of the wireless charging system and a receiving coil provided in a vehicle.

The present disclosure will now be described more fully with reference to the accompanying drawings. With reference to FIGS. 1 and 2, the present disclosure is directed toward a wireless charging system 100 for charging a battery 102 disposed in a vehicle 104. The vehicle 104 may be a hybrid and/or electric vehicle that includes a motor for driving the vehicle. The battery 102 provides power to the motor and/or other components in the vehicle 104.

The wireless charging system 100 includes a transmitting coil 108 (i.e., a primary coil) that induces a current in a receiving coil 110 (i.e. a secondary coil) positioned under the vehicle 104. In an example embodiment, the transmitting coil 108 is part of primary side charge network and the receiving coil 110 is part of a secondary side charge network. The primary side charge network may further include a power electronics circuit 112 that converts electrical power from a main power source 114 to an alternating current that is provided to the transmitting coil 108.

The main power source 114 may be power from an electric grid. The power electronics circuit 112 may be connected to the source via a cable that has one end configured as a plug. The main power source 114 supplies alternating current to the power electronics circuit 112, which may then boost the voltage from the power source 114 and supply alternating current to the transmitting coil 108. The current flowing through the transmitting coil 108 induces a current in the receiving coil 110. In an example embodiment, a switch (not shown) may be provided between the power electronics circuit 112 and the main power source 114 to control the flow of current to the power electronics circuit 112 and the transmitting coil 108.

The receiving coil 110 is electrically coupled to the battery 102 of the vehicle 104 to charge the battery 102. As an example, the secondary side charge network includes the receiving coil 110 and a power electronics circuit 116 that converts the alternating current flowing through the receiving coil 110 to direct current. The direct current is supplied to the battery 102 for charging the battery 102. It should be readily understood that the wireless charging performed between the transmitting coil 108 and the receiving coil 110 may be configured in various suitable ways, and should not be limited to the components described herein.

Figure 3:
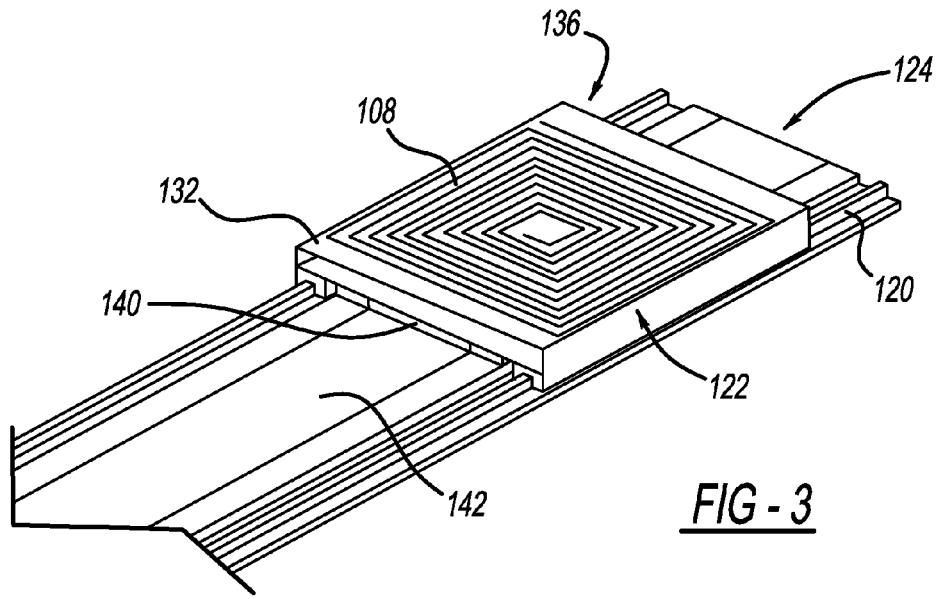
FIG. 3 is a perspective view of a linear motor, a linear track, and a coil charge device of the wireless charging system.

With additional reference to FIG. 3, the wireless charging system 100 further includes a linear track 120, a carriage 122, a linear motor 124, and a charge control module (CCM) 126 (i.e., a controller). The linear track 120 extends along a designated path 128 and the carriage 122 is attached to and is moveable along the linear track 120. As an example, the linear track 120 extends along two or more vehicle parking spaces 130. In FIG. 3, the linear track 120 extends along N number of parking spaces, where N is equal to or greater than 2 (i.e., $130_1, 130_2, \ldots, 130_N$). The linear motor 124 is configured to move the carriage 122 along the linear track 120.

The transmitting coil 108 and the power electronics circuit 112 are positioned on the carriage 122. The carriage 122 may be made of material, such as aluminum, to shield the magnetic field generated between the transmitting coil 108 and the receiving coil 110 from the linear track 120 and the surrounding area.

A cover 132 is positioned over the transmitting coil 108 and is attached to the carriage 122 to protect the transmitting coil 108 and other electrical components from the outside environment. The cover 132 may be made of plastic or other durable material with low permeability. The carriage 122, the transmitting coil 108, the power electronics circuit 112, and the cover 132 may be provided as a coil charge device 136.

The linear motor 124 moves the position of the coil charge device 136 along the linear track 120. In an example embodiment, the carriage 122 is on a rotor 140 of the linear motor 124 and a stator 142 is positioned along the linear track 120. The linear motor 124 is controlled by the charge control module 126. As an example, the charge control module 126 is electrically coupled to the stator 142 and supplies an alternating current to generate an electromagnetic force for moving the rotor 140. The linear motor 124 may be configured in various suitable ways, such as a synchronous motor or an induction motor.

The linear motor 124, the linear track, and the coil charge device 136 may be arranged along a surface upon which the vehicle 104 stands in various suitable ways. For example, the linear motor 124, the linear track 120, and the coil charge device 136 may be positioned such that a top surface of the coil charge device is flush with the surface. In another example, the linear motor 124, the linear track 120, and the coil charge device 136 may be positioned such that the coil charge device 136 is above the surface.

Figure 4:
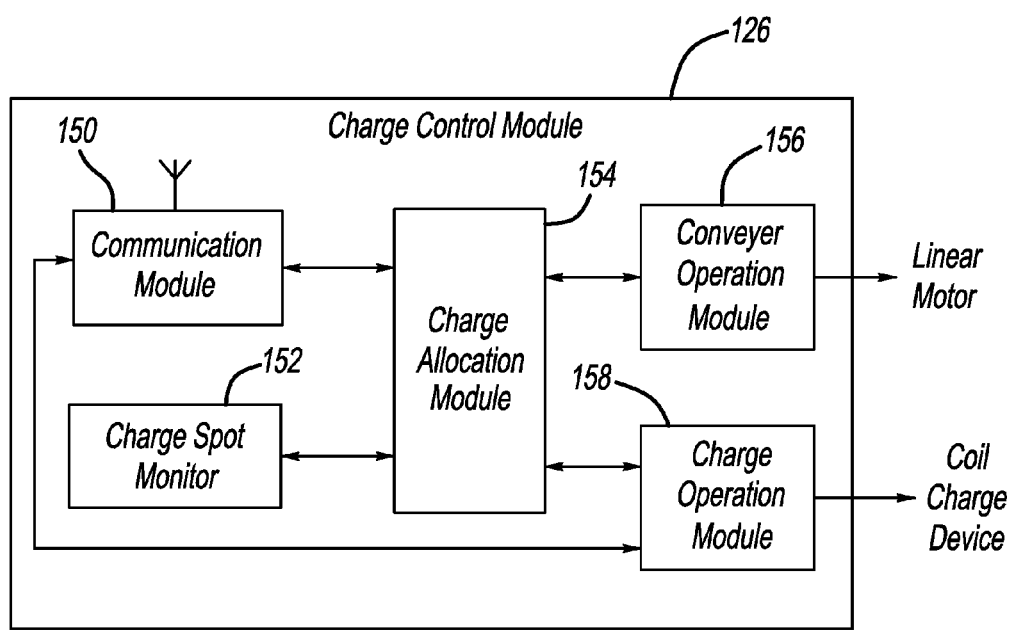
FIG. 4 is a functional block diagram of a charge control module of the wireless charging system.

With reference to FIG. 4, the charge control module 126 may include a communication module 150, a charge spot monitor 152, a charge allocation module 154, a conveyer operation module 156, and a charge operation module 158. The charge control module 126 controls the position of the coil charge device 136 and controls the wireless charging of the battery 102 positioned in the vehicle 104 by way of the transmitting coil 108. For example, the charge control module 126 may be electrically connected to the linear motor 124 via a cable to provide a drive current to the motor 124. The charge control module 126 may also be electrically coupled to the coil charge device 136 to electrically couple and decouple the coil charge device 136 from the main power source 114. In the present disclosure, the term 'module' may refer to, be part of, or include processor hardware (shared, dedicated, or group) that executes code and memory hardware (shared, dedicated, or group) that stores code executed by the processor hardware.

The communication module 150 communicates with one or more vehicles 104 located in the parking spaces 130 via wireless communication. As an example, as illustrated in FIG. 1, a vehicle control module 160 positioned in the vehicle 104 may communicate with the charge control module 126 via short range communication, such as Bluetooth, WIFI, or other suitable wireless communication networks. The communication module 150 exchanges data with the vehicle control module 160 via a wireless communication link. For example, the communication module 150 may receive a battery charge request that includes a state of charge of the battery 102 from the vehicle control module 160. The communication module 150 may notify the vehicle control module 160 of the start and completion of the charge operation.

The charge spot monitor 152 may monitor the parking spaces 130 to determine whether a vehicle is positioned at one of the parking spaces 130. For example, each parking space 130 may include a sensor 162, such as an infrared sensor, that detects the presence of an object (i.e., the vehicle). Alternatively, the charge control module 126 may monitor the parking spaces 130 with an image recognition system that includes a camera and the ability to recognize a vehicle in one or more images taken by the camera. In yet another example, when the vehicle 104 is parked in a free space of the parking lot, the vehicle control module 160 may send a signal to the charge control model 126 by using wireless communication, such as Wi-Fi, Bluetooth, etc. The signal may include information indicating the vehicle's location/position (e.g., parking number). Accordingly, the charge control module 126 may also receive the vehicle's position from the vehicle control module 160. While specific examples are provided for determining the location of the vehicle, other suitable methods may be used for determining the location of a vehicle within the designated path 128.

The charge allocation module 154 assesses the state of charge of the battery 102 for a vehicle located in one of the parking spaces 130 and determines if the battery 102 is to be charged. The charge allocation module 154 also determines which battery is to be charged when more than one vehicle 104 is present in the parking spaces 130. In an example embodiment, the charge allocation module 154 may receive information, such as the battery charge request, from the vehicle control module 160 of the vehicle 104 by way of the communication module 150. If the vehicle 104 has requested a charge and if the coil charge device 136 is not charging another battery, the charge allocation module 154 may have the charge operation module 158 charge the battery 102 of the vehicle 104 requesting to be charged.

In the event that more than one vehicle is positioned in the parking spaces 130 and requests charging, the charge allocation module 154 prioritizes the charge operation of the vehicles based on predetermined factors. For example, in FIG. 1, a first vehicle $104_1$ is provided in parking space $130_1$ and a second vehicle $104_2$ is provided in the parking pace $130_2$. The charge allocation module 154 may determine which of the vehicles 104 should be charged first based on a state of charge of the batteries 102. If the wireless charging system 100 is currently charging the battery 102 of the first vehicle $104_1$ and the second vehicle $104_2$ that has lower state of charge than the first vehicle $104_1$ requests a charge, the charge allocation module 154 may continue to charge the battery 102 of the first vehicle $104_1$ until the state of charge is at a predetermined level (e.g., 40%, 50% charged) before beginning to charge the battery $102_2$ of the second vehicle $104_2$. In other words, the charge allocation module 154 requests that the charge operation module 158 stop charging the first vehicle $104_1$ before the battery 102 of the first vehicle $104_1$ has reached full charge and begin charging the battery 102 of the second vehicle $104_2$.

The charge allocation module 154 may also prioritize the charge of one or more vehicles 104 based on other factors, which is not limited to the state of charge. As an example, when the wireless charging system 100 is implemented in a garage at a vehicle owner's home, the vehicles that may use the wireless charging system may be pre-assigned a priority level. Accordingly, the charge allocation module 154 may determine which vehicle is charged first based on the pre-assigned priority. In another example, the charge allocation module 154 may prioritize the charge of multiple vehicles based on a monetary payment for a standard charge time period. For example, a user may purchase a maximum of one hour of charge time, and the charge allocation module 154 may charge the batteries of multiple vehicles based on a first come first served basis. It should be readily understood that the charge allocation module may be configured in various suitable ways for prioritizing the charge request of multiples vehicles, and is not limited to the examples provided here.

Once the charge allocation module 154 determines which vehicle 104 is to be charged, the charge allocation module 154 transmits the location of the vehicle 104 to the conveyer operation module 156 and transmits the state of charge of the vehicle 104 to charge the operation module 158. The conveyer operation module 156 moves the coil charge device 136 to a position under the vehicle 104 to be charged. For example, the information from the charge allocation module 154 may indicate the specific parking space 130 where the vehicle 104 to be charged is located. The conveyer operation module 156 may then operate the linear motor 124 to move the coil charge device 136 along the linear track 120 to a position under the vehicle 104. As an example, if the vehicle 104 is located in parking space $130_2$ of FIG. 1, the conveyer operation module 156 drives the linear motor 124 to move the coil charge device 136 from the device's current position to a designated position within the parking space $130_2$. In particular, the conveyer operation module 156 may include information regarding the location at which the coil charge device 136 is to be positioned for a given parking space 130.

As another example, the desired position of the coil charge device 136 along the track may be determined by detecting the induced voltage on the receiving coil 110. With an open circuit in the receiving coil 110, the maximum induced voltage at the two ends of the receiving coil 110 indicates the smallest misalignment between the coil charge device 136 and the receiving coil 110. In particular, when the vehicle is parked and ready to be charged, the receiving coil 110 is an open circuit, at first. The coil charge device 136 moves to the receiving coil 110, and the induced voltage across the receiving coil 110 increases to a maximum value. When the induced voltage begins to drop from the maximum value, the coil charge device 136 is stopped and fixed in position. Accordingly, the position of the coil charge device 136 along the track 120 can be fixed while minimizing the misalignment between the coil charge device 136 and the receiving coil 110. Other methods may be used to position the coil charge device 136 under the vehicle 104 and for aligning the coil charge device 136 with the receiving coil 110.

With the coil charge device 136 positioned at the designated position, the conveyor operation module 156 may notify the charge operation module 158 that the coil charge device 136 can be operated to charge the battery 102 via wireless inductance. The charge operation module 158 may supply electric current to the transmitting coil 108 via the power electronics circuit 112 and the main power source 114 to induce a current in the receiving coil 110. In particular, the charge operation module 158 may activate a switch between the power source 114 and the coil charge device 136 to have electric current from the power source 114 flow to the power electronics circuit 112 and the transmitting coil 108.

The charge operation module 158 may also monitor the amount of electric power being supplied to the receiving coil 110 by monitoring the amount of power being supplied to the transmitting coil 108. The charge operation module 158 may also receive information from the vehicle 104 regarding the amount of power received by the receiving coil 110 and the state of charge of the battery 102 via the communication module 150. The charge operation module 158 stops the wireless charging when, for example, the state of charge of the battery 102 reaches a predetermined level or the time period of the allocated charge lapses. The charge operation module 158 my further stop the charge process if instructed by the charge allocation module 154. For example, the charge allocation module may have the charge operation module 408 stop charging the battery 102 of one vehicle in order to charge the battery of another vehicle.

The wireless charging system 100 of the present disclosure utilizes a single transmitting coil 108 to permit charging of multiple vehicles based on a predetermined charge allocation process. In particular, the wireless charging system 100 includes the linear track 120 upon which the transmitting coil 108 may be moved by the linear motor 124. The linear track extends across multiple parking spaces, thereby allowing the transmitting coil 108 to change positions within the wireless charging system 100. Accordingly, the wireless charging system 100 may not require an individual transmitting coil for each parking space, thereby reducing the cost of the wireless charging system.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

In the present disclosure, the module(s) may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as a remote or cloud) module may accomplish some functionality on behalf of a client module.

In the present disclosure, the term memory or memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer. The computer programs include processor-executable instructions that are stored on at least one non-transitory computer-readable medium. The computer programs may also include or rely on stored data.

What is claimed is:

1. A wireless charging system for charging a battery in a vehicle, the vehicle includes a receiving coil positioned on an underside of the vehicle, the wireless charging system comprising:
   a coil charge device including a transmitting coil and a carriage, wherein the transmitting coil is positioned on the carriage;
   a linear track extending across a designated path, wherein the coil charge device is positioned on and moveable along the linear track;
   a linear motor operable to move the coil charge device along the linear track; and
   a charge control module configured to control a position of the coil charge device along the designated path via the linear motor and operate the transmitting coil during a charge operation to charge the battery of the vehicle;
   wherein the charge control module is configured to control the linear motor to position the coil charge device relative to the receiving coil such that an induced voltage across the receiving coil is at a maximum indicating that the charge coil device is aligned with the receiving coil.

2. The wireless charging system claim 1 wherein the linear track extends across two or more parking spaces, and the coil charge device is moveable to any one of the two or more parking spaces.

3. The wireless charging system claim 1 wherein the coil charge device further includes a power electronics circuit connected to the transmitting coil and configured to supply an alternating current to the transmitting coil from a main power source.

4. The wireless charging system of claim 1 wherein the coil charge device includes a cover that is positioned over the transmitting coil and is attached to the carriage.

5. The wireless charging system of claim 1 wherein the charge control module includes a communication module that wirelessly communicates with the vehicle.

6. The wireless charging system of claim 1 wherein the linear motor includes a rotor and a stator, the carriage is positioned on the rotor and the stator extends along the linear track.

7. The wireless charging system of claim 1 wherein the charge control module is connected to the linear motor by way of a cable to supply a drive signal to the linear motor.

8. A wireless charging system for charging a battery in a vehicle, the vehicle includes a receiving coil positioned on an underside of the vehicle, the wireless charging system comprising:
   a coil charge device including a transmitting coil and a carriage, wherein the transmitting coil is positioned on the carriage;
   a linear track extending across a designated path, wherein the designated path extends across one or more parking spaces, and the coil charge device is positioned on and moveable along the linear track;
   a linear motor operable to move the coil charge device along the linear track; and
   a controller configured to wirelessly communicate with one or more vehicles parked at the one or more parking spaces, control a position of the coil charge device along the designated path via the linear motor based on a position of a designated vehicle, and operate the transmitting coil during a charge operation to charge the battery of the designated vehicle, wherein the designated vehicle is one of the one or more vehicles parked at the one or more parking spaces and is in communication with the controller, and during the charge operation, the controller positions the coil charge device under the designated vehicle and supplies power to the transmitting coil to induce an induced voltage in a receiving coil of the designated vehicle;

wherein the charge control module is configured to control the linear motor to position the coil charge device relative to the receiving coil such that the induced voltage across the receiving coil is at a maximum indicating that the charge coil device is aligned with the receiving coil.

9. The wireless charging system of claim 8 wherein the controller selects the designated vehicle from among two or more vehicles parked along the designated path and in communication with the controller based on a predetermine parameter.

10. The wireless charging system of claim 9 wherein the predetermined parameter is a state of charge of the battery provided in each of the vehicles, and the battery of the designated vehicle selected by the controller has lowest state of charge from the two or more vehicles.

11. The wireless charging system of claim 8 wherein the coil charge device further includes a power electronic circuit connected to the transmitting coil and configured to supply an alternating current to the transmitting coil from a main power source.

12. The wireless charging system of claim 8 wherein the coil charge device includes a cover that is positioned over the transmitting coil and attached to the carriage.

13. The wireless charging system of claim 8 wherein the linear motor includes a rotor and a stator, the carriage is positioned on the rotor, and the stator extends along the linear track.

14. The wireless charging system of claim 8 wherein the controller monitors the designated path to determine whether a given vehicle is parked along the designated path.

15. The wireless charging system of claim 8 wherein the controller is connected to the linear motor by way of a cable to supply a drive signal to the linear motor.

16. The wireless charging system of claim 8 wherein the controller is connected to the coil charge device by way of a cable.

* * * * *

UNITED STATES PATENT AND TRADEMARK OFFICE
CERTIFICATE OF CORRECTION

PATENT NO. : 10,000,134 B2
APPLICATION NO. : 15/082475
DATED : June 19, 2018
INVENTOR(S) : Zhang et al.

Page 1 of 1

It is certified that error appears in the above-identified patent and that said Letters Patent is hereby corrected as shown below:

Column 8, Claim 2, Line 18, after "system", insert --of--

Column 8, Claim 3, Line 22, after "system", insert --of--

Signed and Sealed this
Twenty-fifth Day of September, 2018

Andrei Iancu
*Director of the United States Patent and Trademark Office*